United States Patent
Ramesh

[19]

[11] Patent Number: 6,110,600
[45] Date of Patent: Aug. 29, 2000

[54] FILM, BACKSEAMED CASINGS THEREFROM, AND PACKAGED PRODUCT USING SAME

[75] Inventor: Ram K. Ramesh, Greenville, S.C.

[73] Assignee: Cryovac, Inc., Duncan, S.C.

[21] Appl. No.: 09/243,363

[22] Filed: Feb. 1, 1999

Related U.S. Application Data

[62] Division of application No. 08/506,992, Jul. 28, 1995, Pat. No. 5,866,214.

[51] Int. Cl.$^7$ .................................................. A22C 13/00
[52] U.S. Cl. ................ 428/476.9; 428/34.8; 428/474.7; 428/475.2; 428/476.3; 428/483; 138/118.1; 426/106; 426/129; 426/138
[58] Field of Search ............................. 428/34.8, 474.7, 428/475.2, 476.3, 476.9, 483; 426/106, 138, 129; 138/118.1

[56] References Cited

U.S. PATENT DOCUMENTS

| | | | |
|---|---|---|---|
| 2,911,305 | 11/1959 | Ramsey | 99/171 |
| 3,762,986 | 10/1973 | Bhuta et al. | 161/227 |
| 4,302,565 | 11/1981 | Goeke et al. | 526/88 |
| 4,302,566 | 11/1981 | Karol et al. | 526/125 |
| 4,411,919 | 10/1983 | Thompson | 426/412 |
| 4,448,792 | 5/1984 | Schirmer | 426/113 |
| 4,469,742 | 9/1984 | Oberle | 428/215 |
| 4,606,922 | 8/1986 | Schirmer | 426/412 |
| 4,734,327 | 3/1988 | Vicik | 428/332 |
| 4,746,562 | 5/1988 | Fant | 428/213 |
| 4,758,463 | 7/1988 | Vicik et al. | 428/216 |
| 4,762,748 | 8/1988 | Oberle | 428/349 |
| 4,784,863 | 11/1988 | Lustig et al. | 426/113 |
| 4,855,183 | 8/1989 | Oberle | 428/345 |
| 4,857,408 | 8/1989 | Vicik | 428/474 |
| 4,863,769 | 9/1989 | Lustig et al. | 428/34 |
| 4,879,430 | 11/1989 | Hoffman | 428/35 |
| 4,892,765 | 1/1990 | Hisazumi et al. | 428/34 |
| 4,911,963 | 3/1990 | Lustig et al. | 428/36 |
| 5,047,253 | 9/1991 | Juhl et al. | 426/113 |
| 5,051,266 | 9/1991 | Juhl et al. | 426/129 |
| 5,079,051 | 1/1992 | Garland et al. | 428/34 |
| 5,139,805 | 8/1992 | Tada et al. | 426/412 |
| 5,206,075 | 4/1993 | Hodgson, Jr. | 428/216 |
| 5,213,900 | 5/1993 | Friedrich | 428/474 |
| 5,241,031 | 8/1993 | Mehta | 526/348 |
| 5,272,236 | 12/1993 | Lai et al. | 526/348 |
| 5,278,272 | 1/1994 | Lai et al. | 526/348 |
| 5,298,326 | 3/1994 | Norpoth et al. | 428/349 |
| 5,328,705 | 7/1994 | Wilhott et al. | 426/113 |
| 5,356,676 | 10/1994 | Von Widdern et al. | 428/34.8 |
| 5,425,974 | 6/1995 | Von Widdern et al. | 428/354 |

FOREIGN PATENT DOCUMENTS

| | | |
|---|---|---|
| 0 589 431 A1 | 3/1994 | European Pat. Off. . |
| 0 603 678 A1 | 6/1994 | European Pat. Off. . |
| 40 01 612 A1 | 7/1991 | Germany . |
| 2 126 191 | 3/1984 | United Kingdom . |
| WO 90/03414 | 4/1990 | WIPO . |
| WO 93/03093 | 2/1993 | WIPO . |

*Primary Examiner*—Charles Nold
*Attorney, Agent, or Firm*—Rupert B. Hurley, Jr.

[57] ABSTRACT

A backseamed casing has a casing film comprising a first outer layer and a second outer layer, the first outer layer containing a polyamide having a melting point of from about 250–400° F., and the second outer layer containing a polyamide having a melting point of from about 250–400° F. A butt-sealed backseamed casing has a casing film to which a butt-seal tape film is sealed, the casing film having an inside layer containing a polyamide having a melting point of from about 250–480° F., and an outside layer comprising polyolefin, with the butt-seal tape film comprising polyolefin. A heat-shrinkable film has a first outer layer, a second outer layer, and an inner layer. The first outer layer contains a first polyamide having a melting point of from about 250–400° F.; and the second outer layer contains a second polyamide having a melting point of from about 250–480° F.; the inner layer contains a first composition comprising at least one member selected from the group consisting of a third polyamide, a polyester; and, the first inner layer having a thickness of at least about 5% of a total thickness of the heat-shrinkable film. A package comprises a cooked meat product packaged in the film or casing according to the invention, in which the cooked meat adheres to the film.

25 Claims, 7 Drawing Sheets

FILM, BACKSEAMED CASINGS THEREFROM, AND PACKAGED PRODUCT USING SAME

This application is a divisional of Ser. No. 08/506,992 filed Jul. 28, 1995, U.S. Pat. No. 5,866,214.

FIELD OF THE INVENTION

The present invention relates generally to multilayer films, and particularly to multilayer films suitable for use in backseamed casings for packaging meat products. The present invention is particularly related to backseamed casings suitable for packaging protein-containing food products in which the film adheres to the food product, especially those having a relatively low protein content, such as liver sausage, bologna, mortadella, etc. As such, the present invention is also directed to packages and packaged products.

BACKGROUND OF THE INVENTION

Processed meat products, such as sausage, are often packaged in casings made from thermoplastic, heat-shrinkable films. Although some casings have a lay flat width of 6–20 inches, some products, such as liver sausage, etc., are quite often packaged in casings of smaller width, e.g., widths of 3–6 inches. Such casings often may need to have a precisely-controlled width, because the packaged products are sliced at uniform intervals. The slices need to be of uniform weight, because the packages are sold with a stated number of slices, and the package is stated as having a specific weight. If the diameter of the casing is not uniform, the weight of the slices will vary to an unacceptable degree.

Thus, there is a need for casings having a small and uniform diameter. In order to achieve this result, backseamed casings have been provided, these casings having a longitudinal seal, i.e., backseam, which enables a precisely controlled casing width, independent of film extrusion variations. In the production of backseamed casings, e.g., using a backseaming machine such as a Nishibe HSP-250-SA backseaming machine obtained from Nishibe Kikai Co. Ltd. of Nagoya, Japan, a flat sheet of film is folded longitudinally by passage over a "forming shoe." (A forming shoe is part of the backseaming machine which the film is passed under and around, i.e., so that the initially flat film is reconfigured as a tube, having a longitudinal overlap and seal therealong, with the width of the tube being determined by the circumference of the forming shoe.) A longitudinal lap or butt seal is then applied while the film is between the forming shoe and a sealing device, so that a seamed casing is formed. Butt seal casings have a butt seal tape sealed to one of the outer surfaces of the casing film. In either event, the resulting tubing, termed a "backseamed casing," is sealed or clipped at its ends after being filled with a meat product For some uses, the meat product is thereafter cooked while in the backseamed casing.

It is also desirable to provide a film suitable for cook-in end use, which film adheres to meat products having relatively low protein content, i.e., high-fat/low-protein meat products. Of course, it is desirable to provide a backseamed casing in which the backseam seal survives the cook-in process, and in which the backseamed casing is of highly uniform width.

Typically, a polar surface is needed for adhesion of the film to meat products having relatively low protein content. This polarity can be provided either by using polar resins or through surface modification such as corona treatment. Typically, polar polymers used for meat adhesion include polymers such as ethylene/unsaturated acid copolymer, anhydride-containing polyolefin, and polyamide. However, ethylene/unsaturated acid copolymer and anhydride-containing polyolefin often do not provide adequate meat adhesion to these low protein containing meat products, whereas polyamide can be used to provide adequate meat adhesion for low protein/high fat meat products such as liver sausage, bologna, mortadella, etc.

Furthermore, adhesion of meat to a film can be enhanced by corona treating the surface of the film to which the meat is to be adhered. However, inferior seals, i.e., leaky seals, can result upon sealing a film which is corona treated, relative to the same film which is not corona treated. This leaky seal problem characteristic of such corona treated films can be avoided by "buffing off" the corona treatment in the area of the seal, so that the advantageous effects of the corona treatment, i.e., greater meat adhesion, especially to high fat meat products, can be retained, while at the same time avoiding the seal problems caused by the corona treatment. However, the buffing step is undesirable, as it is an additional processing step, and is frequently inconsistent.

Furthermore, if backseaming is carried out after corona treatment, the shrinkage of the film against the forming shoe rubs the film against the forming shoe edges, thereby reducing or destroying the increased meat adhesion from the corona treatment, at least in the area in which the film rubbed against the forming shoe. As a result, such films exhibit purge or fatting out at those locations, an undesirable effect. Furthermore, corona treatment has been found to be inconsistent, at least with respect to prevention of purge for products relatively low in protein content. As a result, it would be desirable to provide a corona-treatment-free backseamed casing which prevents purge from products relatively low in protein.

Finally, oriented films containing an outer polyamide layer can have watermarks on the polyamide surface of the film if water is used as a heat transfer medium immediately prior to the orientation step. Watermarks can adversely affect subsequent printing, due to the roughness caused by the watermarks on the surface of the film. Although there are ways to prevent watermarks on the polyamide layer, such prevention means may be undesirable in that they complicate the process, and frequently do not entirely eliminate the watermarks. Accordingly, it would be desirable to eliminate watermarks entirely, or at least eliminate the detrimental effects of watermarks.

SUMMARY OF THE INVENTION

It has been discovered that heat-shrinkable films having polyamide outer layers, which are otherwise suitable for use as backseamed casings, have the undesirable characteristic of necking down on the forming shoe. These films contained polyamide outer layers and polyolefin inner layers, together with an inner $O_2$-barrier layer comprising EVOH. The necking down on the forming shoe is believed to be due to shrinkage of the film during the heat sealing step of the backseaming operation. That is, the heat sealing step can cause substantial film shrinkage in an area extending outward from the seal, causing the edges of the casing to neck down on the forming shoe. The result of necking down is a casing having "ruffled edges", i.e., visible nonuniformities in the casing. In an extreme case, necking down results in the rupture of the film, as the shrinking of the film against the forming shoe places so much force on the film that the film ruptures.

It has been discovered that the presence of an inner layer comprising a polyamide, preferably a high modulus polyamide, results in a film which does not neck down on the forming shoe during the backseaming operation. Although the reason(s) why the inner polyamide layer prevent necking down on the forming shoe are not currently known with certainty, it is believed that various factors, including heat transfer, shrink characteristics, etc. bring about the discovered advantage of not necking down on the forming shoe.

Furthermore, the presence of seal layer(s) comprising polyamide provides the film with adequate seal strength for cook-in end use and adequate protein adhesion. Thus, it is desirable to provide the film with polyamide outer layers.

A preferred film according to the present invention is a multilayer film having the following characteristics: (1) outer layers comprising polyamide, with both outer layers being capable of being sealant layers with respect to one another and providing a seal suitable for cook-in end use; (2) a core layer comprising a polyamide having a relatively high modulus; (3) low curl, i.e., so that the film does not wrinkle, crease, fold, or curl during the backseaming operation, which would detrimentally affect the quality of the seal; (4) the capability of adhering to a meat product during cook-in, especially processed meats having a relatively low protein content; (5) a relatively high free shrink; and (6) a second core layer which serves as a bulk layer and which allows a tape to be oriented into an oriented film.

The film according to the present invention has a polyamide-containing meat-adhesion layer which provides a high level of meat adhesion, especially to high-fat/low-protein meat products. Although the film of the invention can be corona treated, the film of the invention does not require corona treatment in order to exhibit a desired level of meat adhesion. Thus, the film of the present invention avoids the "buffing off problem" associated with corona treatment, while at the same time achieving a level of meat adhesion which is at least as high as, for example, corona treated, anhydride-modified linear low density polyethylene, and with far better consistency, because, in general, corona treatment is not very uniform.

Furthermore, if the film according to the present invention is obtained by orienting a tubular tape out of hot water (which results in watermarks on the outside surface of the tape if the outer surface comprises a polar polymer, such as nylon), the film can be used in a manner providing the further advantage of not having watermarks on the printed surface. That is, upon orientation of the tube out of hot water, the resulting oriented film tube is slit, ply separated, and wound, and thereafter printed on the outer surface which was the inside polyamide layer of the film tube. In this manner, one can avoid printing on the watermarked surface of the film. Furthermore, if one or more of the inner film layers is pigmented, the adverse visual effects of the watermarks cannot be seen.

As a first aspect, the present invention is directed to a heat-shrinkable film comprising: (A) a first outer layer comprising a first polyamide having a melting point of from about 250° F.–400° F.; (B) a second outer layer comprising a second polyamide having a melting point of from about 250° F.–480° F.; and (C) an inner layer comprising at least one member selected from the group consisting of polyester and a third polyamide, wherein the first inner layer has a thickness of at least about 5% of a total thickness of the heat-shrinkable film.

Preferably, the heat-shrinkable film further comprises a second inner layer comprising polyolefin, wherein a total thickness of the first outer layer, the second outer layer, and the inner layer is less than about 80 percent, based on a total thickness of the multilayer film. Preferably, the polyolefin has both a crystallinity less than the crystallinity of the first inner layer, and a modulus less than the modulus of the first inner layer. Preferably, the polyolefin in the second inner layer is a first polyolefin, with the film further comprising a third inner layer comprising a second polyolefin. Preferably, the first polyamide has a melting point of from about 260° F.–360° F., and the second polyamide has a melting point of from about 260° F.–360° F. More preferably, the first polyamide has a melting point of from about 275° F.–350° F., and the second polyamide has a melting point of from about 275° F.–350° F.

Preferably, the first polyolefin comprises at least one member selected from the group consisting of polypropylene, polyethylene, and polybutene; and the second polyolefin comprises at least one member selected from the group consisting of polypropylene, polyethylene, and polybutene. More preferably: (a) the first polyolefin comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and, (b) the second polyolefin comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

Preferably, the first and second polyamides each comprises at least one member selected from the group consisting of copolyamide 6/12, polyamide 12, copolyamide 66/69/6I, copolyamide 66/610, copolyamide 6/66, and copolyamide 6/69; and the second polyamide comprises at least one member selected from the group consisting of copolyamide 6/12, polyamide 12, copolyamide 66/69/6I, copolyamide 66/610, copolyamide 6/66, and copolyamide 6/69. Preferably, the first polyamide and the second polyamide are chemically substantially identical.

Preferably, the first and second polyamides each comprises at least one member selected from the group consisting of: (a) copolyamide 6/12 comprising (i) caprolactam mer in an amount of from about 20 to 80 weight percent, and (ii) laurolactam mer in an amount of from about 80 to 20 weight percent; (b) polyamide 12; (c) copolyamide 66/69/6I comprising 10 to 50 weight percent hexamethylene adipamide mer (more preferably, from about 20 to 40 weight percent); 10 to 50 weight percent polyamide 69 mer (more preferably, from about 20 to 40 weight percent); and, 10 to 60 weight percent hexamethylene isophthalamide mer (more preferably, from about 10 to 40 weight percent).

In the heat-shrinkable film according to the invention, preferably: the inner layer is a first inner layer and comprises the third polyamide; the film further comprises a second inner layer comprising a first polyolefin; and, the film further comprises a third inner layer comprising a second polyolefin.

Preferably, the third polyamide comprises at least one member selected from the group consisting of polyamide 6, polyamide 11, polyamide 12, polyamide 610, polyamide 66, polyamide 69, polyamide 612, copolyamide 6/66, copolyamide 66/610. Preferably, the third polyamide has a melting point of at least 350° F.; more preferably, at least 390° F.

Preferably, the first inner layer further comprises a fourth polyamide having a melting point of less than about 350° F. Preferably, the first inner layer comprises: (a) polyamide 6 in an amount of from about 40 to 90 weight percent, based on the weight of the first inner layer; and (b) copolyamide 6/12 in an amount of from about 10 to 60 weight percent, based on the weight of the first inner layer, wherein the copolyamide 6/12 comprises caprolactam mer in an amount of from about 30 to 70 weight percent (more preferably, 40 to 60 weight percent).

Preferably, the second inner layer comprises a first anhydride-modified polyolefin, and the third inner layer comprises a second anhydride-modified polyolefin.

Preferably, the heat-shrinkable film further comprises a fourth inner layer which is an $O_2$-barrier layer. Preferably, the $O_2$-barrier layer comprises at least one member selected from the group consisting of ethylene/vinyl alcohol copolymer, polyvinylidene chloride, polyamide, and polyalkylene carbonate.

Preferably, the heat-shrinkable film further comprises a first tie layer between the $O_2$-barrier layer and the first outer layer, and a second tie layer between the $O_2$-barrier layer and the second outer layer.

As a second aspect, the present invention pertains to a butt-sealed backseamed casing comprising a casing film and a butt-seal tape film, wherein: (a) the casing film comprises an inside layer comprising polyamide having a melting point of from about 250° F.–480° F., and an outside layer comprising polyolefin; and (b) the butt-seal tape film comprises polyolefin. Preferably, the casing film further comprises an inner $O_2$-barrier layer. Preferably, the casing film further comprises a tie layer.

Preferably, the butt-seal tape film further comprises an $O_2$-barrier layer. More preferably, the butt-seal tape film further comprises a tie layer. Still more preferably, the butt-seal tape film comprises an $O_2$-barrier layer between two outer layers, each of which comprises polyolefin. The butt-seal tape film can be heat-shrinkable. Yet still more preferably, the butt-seal tape film comprises an outer sealing layer comprising polyolefin having a melting point of from about 90° C.–150° C.; more preferably, from about 100° C.–130° C.

Preferably, the casing film further comprises an inner layer comprising a polyolefin. Preferably, the outside polyolefin layer comprises at least one member selected from the group consisting of propylene/alpha-olefin copolymer, linear low density polyethylene, very low density polyethylene, and low density polyethylene. Preferably, the casing film is heat-shrinkable, and preferably, the butt-seal tape film is heat-shrinkable. Preferably, the casing film further comprises an inner layer comprising a second polyamide having a melting point of at least 350° F.

As a third aspect, the present invention pertains to a backseamed casing comprising a casing film comprising: (a) a first layer, the first layer being a first outer layer comprising polyamide having a melting point of from about 250° F.–400° F.; and (b) a second layer, the second layer being a second outer layer comprising polyamide having a melting point of from about 250° F.–400° F. Preferably, the casing film is heat-shrinkable. Preferably, the backseam casing is a lap-seal backseam casing. Optionally, the backseamd casing is a butt-seal backseam casing comprising a butt-seal tape film.

Preferably, the casing film further comprises: (a) a third layer, the third layer being an inner layer, the third layer comprising polyolefin; (b) a fourth layer, the fourth layer being an inner layer, the fourth layer comprising at least one member selected from the group consisting of ethylene/ carboxylic acid copolymer, ethylene/ester copolymer, anhydride-modified polyolefin, and polyurethane; and (c) a fifth layer, the fifth layer being an inner layer, the fifth layer comprising at least one member selected from the group consisting of ethylene/carboxylic acid copolymer, ethylene/ ester copolymer, anhydride-modified polyolefin, and polyurethane. Preferably, the casing film further comprises a sixth layer, the sixth layer being an $O_2$-barrier layer, the sixth layer comprising at least one member selected from the group consisting of ethylene/vinyl alcohol copolymer, polyvinylidene chloride, polyamide, and polyalkylene carbonate.

Preferably, the casing film according to the invention is heat-shrinkable, and further comprises: (a) a first inner layer comprising at least one member selected from the group consisting of a third polyamide, and a polyester, wherein the first inner layer has a thickness of at least about 5% of a total thickness of the heat-shrinkable film; and (b) a second inner layer comprising polyolefin. More preferably, the casing film further comprises a third inner layer comprising polyolefin.

A first set of preferred films for use in the backseamed casing according to the present invention include the heat-shrinkable films in accordance with the preferred heat-shrinkable film of the present invention. A second set of preferred films for use in the backseamed casing according to the present invention are non-heat-shrinkable films. A first subset of this second set of films has a chemical composition, layer number and arrangement, etc., otherwise in accordance with the preferred heat-shrinkable film of the present invention. A second subset of the second set of films are non-heat-shrinkable films having outer layers comprising polyamide, without having a polyamide inner layer.

As a fourth aspect, the present invention pertains to a package comprising a cooked meat product packaged in a heat-shrinkable film comprising: (a) a first outer layer comprising a first polyamide having a melting point of from about 250° F.–400° F.; (b) a second outer layer comprising a second polyamide having a melting point of from about 250° F.–480° F.; and, (c) an inner layer comprising at least one member selected from the group consisting of polyester and a third polyamide, wherein the inner layer has a thickness of at least about 5% of a total thickness of the heat-shrinkable film; wherein the cooked meat adheres to the film. Preferably, the cooked meat product comprises at least one member selected from the group consisting of liver sausage, mortadella, bologna, braunschweiger, poultry, ham, beef, and fish. Preferably, the meat comprises at least 5% fat. Preferred heat-shrinkable films for use in the package include the preferred films, including casing films, according to the present invention.

As a fifth aspect, the present invention pertains to a package comprising a cooked meat product packaged in a backseamed casing comprising a casing film comprising: (a) a first outer layer comprising polyamide having a melting point of from about 250° F.–400° F.; and (b) a second outer layer comprising polyamide having a melting point of from about 250° F.–400° F.; wherein the cooked meat adheres to the film. Preferred casing films include the preferred films, including casing films, according to the present invention.

DETAILED DESCRIPTION OF THE INVENTION

Figure 1:
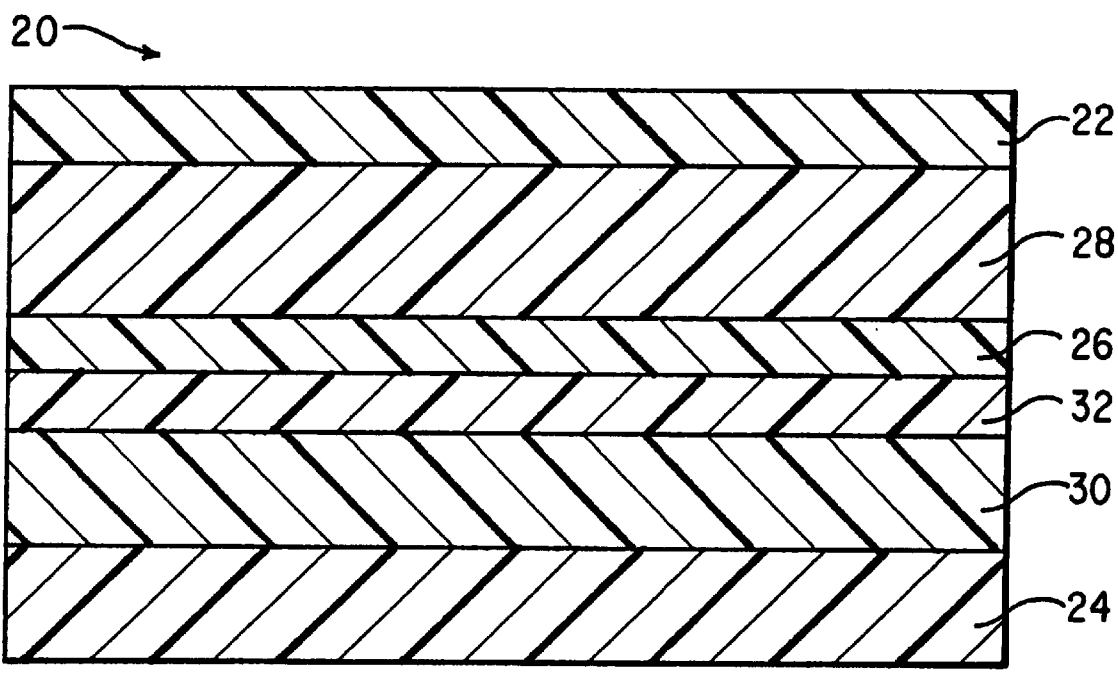
FIG. 1 illustrates an enlarged cross-sectional view of a six-layer multilayer film in accord with the present invention.

As used herein, the phrase "backseamed casing" refers to any casing having a longitudinal seal. For example, a lap-seal backseamed casing can be formed: by folding a film strip over a forming shoe of a horizontal sealing machine, and applying a longitudinal seal thereto where the film overlaps, e.g. using a Nishibe Model HSP-250-SA sealing machine; or a Totani Model FD-350C sealing machine obtained from Totani Giken Kogyo Co., Ltd., of Kyoto, Japan; or, by folding a film strip over a forming shoe of a vertical form fill and seal machine, and applying a longitudinal seal thereto where the film overlaps, e.g., using an ONPACK-2002 (TM) sealing machine, obtained from Orihiro Company, Ltd., of Tomioka City, Japan. A butt-seal backseamed casing can be formed: by folding a film strip over a forming shoe of a horizontal sealing machine, with opposing longitudinal edges abutting one another, i.e., in non-overlapping relation to one another; and thereafter, by applying a butt-seal tape film over the abutting edges, followed by sealing the butt-seal tape film across and along the abutting edges, so that a sealed tube is formed.

For multilayer films, the composition in the first inner layer can be present either in one or more layers of the film. For heat-shrinkable films, the preferred films may have the composition in the first inner layer, in two layers for symmetry, or in more than two layers.

Heat-shrinkable multilayer films of the invention preferably have a substantially symmetrical cross-section, with respect to both layer thickness and layer chemical composition, in order to provide the film with relatively low curl.

The heat-shrinkable casing film according to the present invention preferably has a free shrink of from about 5–70 percent in at least one direction (i.e., longitudinal (machine) direction "L" or transverse direction, "T") at 185° F., determined according to ASTM D 2732; more preferably, from about 10–50 percent at 185° F.; still more preferably, from about 15–35 percent at 185° F. Preferably, the casing film is biaxially oriented, and preferably the film has a free shrink, at 185° F., of at least 10 percent in each direction (L and T); more preferably, at least 15 percent in each direction. Preferably, the casing film has a total free shrink of from about 30 to 50 percent (L+T) at 185° F. For a butt seal backseamed casing, the butt seal tape film can be either a heat-shrinkable film or a non-heat-shrinkable film.

For nonshrink films, it may also be desirable to have a core nylon layer. Some relatively inexpensive polyamides such as nylon-6, nylon 66, and nylon 6/66 provide the film with higher modulus, better elastic recovery, and better dimensional stability after the cook cycle (i.e., better width control), and this is especially true for vertical cook applications where incorporation of the nylon core layer can help reduce or minimize the teardropping properties of the structure. Teardropping is caused by the hydrostatic pressure of the product and modulus of the film, whereupon, upon cooking, the hydrostatic pressure exerted by the product causes the package width to increase towards the bottom of the vertically-oriented package. In such cases, for such applications it may be preferable to use a high melting point crystalline nylon in the core layer, especially for wider package widths, that is, diameters of at least 2.5 inches.

As used herein, the term "sealed" refers to any and all means of closing a package, such as heat sealing via hot air and/or heated bar, ultrasonic, radio frequency sealing, and even the use of clips on, for example, a shirred casing, etc. As used herein, the phrase "heat seal" refers to a seal formed by contacting the film with a hot element, e.g., using a hot bar, hot wire, hot air, etc.

Figure 5:
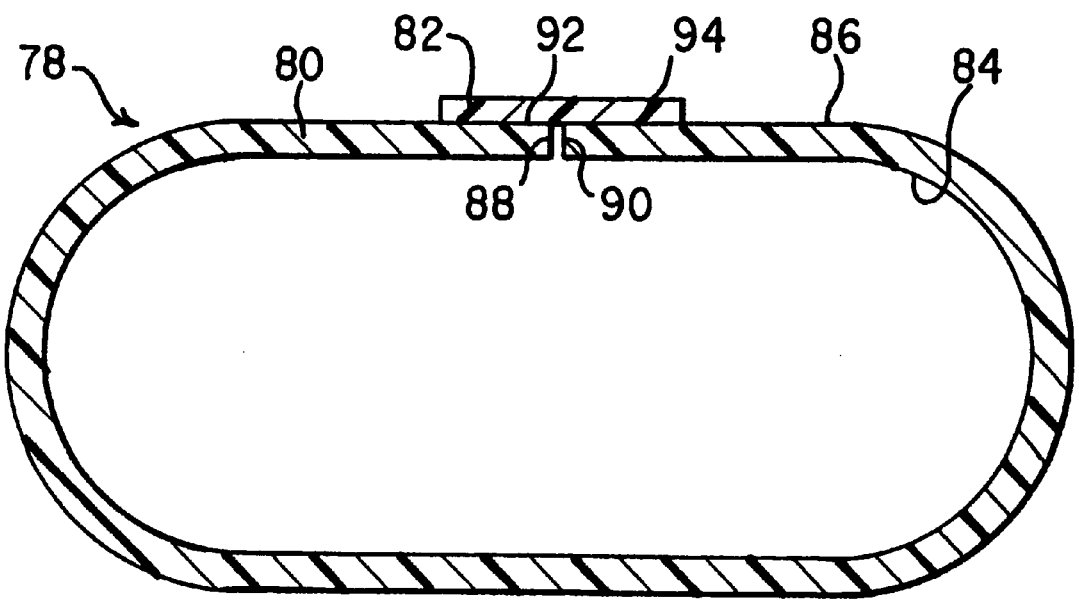
FIG. 5 illustrates a cross-sectional view of a butt-sealed backseamed casing.

As used herein, the phrase "butt seal" refers to a seal formed by butting opposing film edges together and thereafter sealing regions in the vicinity of the abutted edges to a butt seal tape, as shown in FIG. 5.

Figure 4:
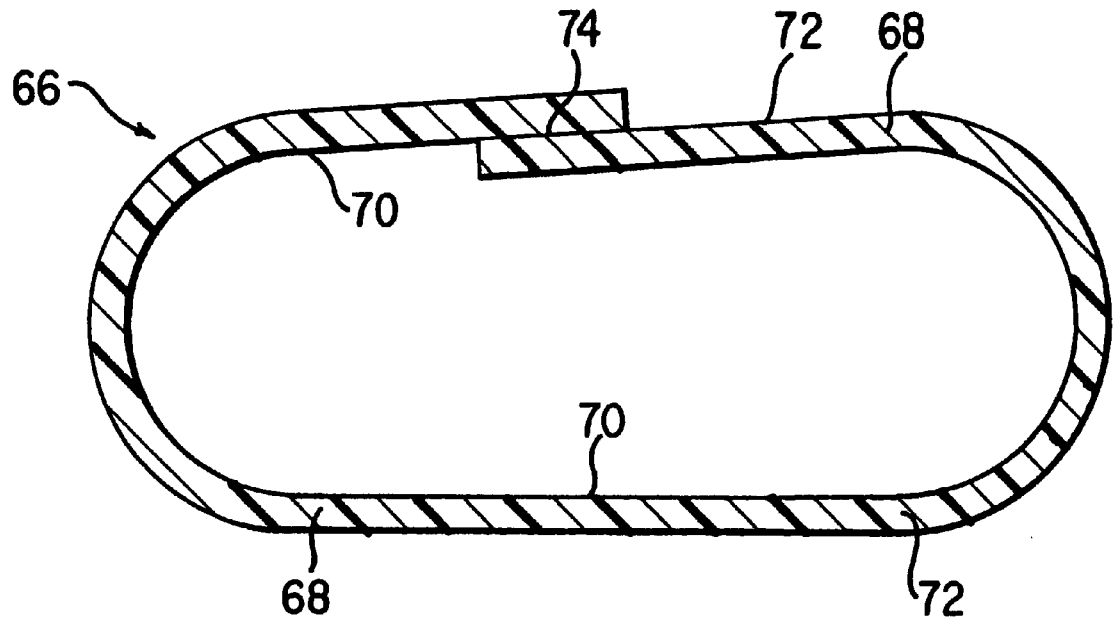
FIG. 4 illustrates a cross-sectional view of a lap-sealed backseamed casing.

As used herein, the phrase "lap seal" refers to a seal formed by lapping a film over itself to form a package by sealing an inside surface of the film to an outside surface of the film, as shown in FIG. 4.

As used herein, the phrase "meat-contact layer", refers to a layer of a multilayer film which is in direct contact with the meat-containing product packaged in the film. The meat-contact layer is an outer layer, in order to be in direct contact with the meat product. The meat-contact layer is an inside layer in the sense that in the packaged meat product, the meat-contact layer is the innermost film layer in direct contact with the food.

As used herein, the phrase "meat-contact surface" refers to a surface of a meat-contact layer which is in direct contact with the meat in the package.

As used herein, the phrase "meat-adhesion", and "adhered", refer to maintaining direct contact between the meat surface and the meat-contact surface of the film, so that there is an absence of fat or a substantial amount of free moisture, e.g., juices emitted outside of the meat product, commonly referred to as "purge". In general, there is an absence of a substantial amount of free moisture if the level of free moisture is from about 0 to 2%, based on the weight of the meat product before cooking. Preferably the amount of free moisture is from about 0 to 1%, more preferably, 0 to 0.5%, and still preferably from 0 to 0.1 percent based on the weight of the meat product before cooking.

As used herein, the phrase "cook-in" refers to the process of cooking a product packaged in a material capable of withstanding exposure to long and slow cooking conditions while containing the food product, for example cooking at 57° C. to 121° C. (i.e, 135° F.–250° F.) for 2–12 hours, preferably 57° C. to 95° C. (i.e, 135° F.–203° F.) for 2–12 hours. Cook-in packaged foods are essentially pre-packaged, pre-cooked foods which may be directly transferred to the consumer in this form. These types of foods may be consumed with or without warming. Cook-in packaging materials maintain seal integrity, and in the case of multilayer films are delamination resistant. Cook-in films may also be heat-shrinkable under cook-in conditions so as to form a tightly fitting package. Cook-in films preferably have a tendency for adhesion to the food product, thereby preventing "cook-out", which is the collection of juices between the outer surface of the food product and the meat-contact surface of the film, i.e., the surface in direct contact with the meat Additional optional characteristics of films for use in cook-in applications include delamination-resistance, low $O_2$ permeability, heat-shrinkability representing about 20–50% biaxial shrinkage at about 85° C. (185° F.), and optical clarity.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably at least 50% and more preferably at least 85%.

As used herein, the term "barrier", and the phrase "barrier layer", as applied to films and/or film layers, is used with reference to the ability of a film or film layer to serve as a barrier to $O_2$.

As used herein, the term "lamination", and the phrase "laminated film", refer to the process, and resulting product, made by bonding together two or more layers of film or other materials. Lamination can be accomplished by joining layers with adhesives, joining with heat and pressure, corona treatment, and even spread coating and extrusion coating. The term laminate is also inclusive of coextruded multilayer films comprising one or more tie layers.

As used herein, the term "oriented" refers to a polymer-containing material which has been stretched at an elevated temperature (the orientation temperature), followed by being "set" in the stretched configuration by cooling the material while substantially retaining the stretched dimensions. Upon subsequently heating unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". The degree of orientation is also referred to as the orientation ratio, or sometimes as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, etc. In general, the layers of a film can consist essentially of a single polymer, or can have still additional polymers blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers.

As used herein, a copolymer identified in terms of a plurality of monomers, e.g., "propylene/ethylene copolymer", refers to a copolymer in which either monomer copolymerizes in a higher weight or molar percent. However, the first listed monomer preferably is polymerized in a higher weight percent than the second listed monomer, and, for copolymers which are terpolymers, quadripolymers, etc., preferably, the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. Such phrases as "ethylene alpha-olefin copolymer" is the respective equivalent of "ethylene/alpha-olefin copolymer."

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers are useful in various layers of the multilayer film used in the present invention. Homogeneous polymers exhibit a relatively even sequencing of comonomers within a chain, the mirroring of sequence distribution in all chains, and the similarity of length of all chains, and are typically prepared using metallocene, or other single-site type catalysis.

More particularly, homogeneous ethylene/alpha-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers useful in this invention will have a ($M_w/M_n$) of less than 2.7. Preferably, the ($M_w/M_n$) will have a range of about 1.9 to 2.5. More preferably, the ($M_w/M_n$) will have a range of about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes the homogeneous copolymers used in the present invention (narrow composition distribution as assessed by CDBI values generally above 70%) from heterogeneous polymers such as VLDPEs available commercially which generally have a broad composition distribution as assessed by CDBI values generally less than 55%. The CDBI of a copolymer is readily calculated from data obtained from techniques known in the art, such as, for example, temperature rising elution fractionation as described, for example, in Wild et al., *J. Poly. Sci. Poly. Phys. Ed.,* Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers in the multilayer films of the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point ($T_m$), as determined by Differential Scanning Colorimetry (DSC), of from about 60° C. to 110° C. Preferably, the homogeneous copolymer has a DSC peak $T_m$ of from about 90° C. to 110° C. As used herein, the phrase "essentially single melting point" means that at least about 80%, by weight, of the material corresponds to a single $T_m$ peak at a temperature within the range of from about 60° C. to 110° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a $C_3$–$C_{20}$ a-monoolefin, more preferably, a $C_4$–$C_{12}$ a-monoolefin, still more preferably, a $C_4$–$C_8$ a-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing homogeneous polymers are disclosed in U.S. Pat. No. 5,206,075, U.S. Pat. No. 5,241,031, and PCT International Application WO 93/03093, each of which is hereby incorporated by reference thereto, in its entirety. Further details regarding the production and use of one genus of homogeneous ethylene/alpha-olefin copolymers are disclosed in U.S. Pat. No. 5,206,075, to HODGSON, Jr.; U.S. Pat. No. 5,241,031, to MEHTA; PCT International Publication Number WO 93/03093, in the name of Exxon Chemical Company; PCT International Publication Number WO 90/03414, in the name of Exxon Chemical Patents, Inc., all four of which are hereby incorporated in their entireties, by reference there. Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated in their entireties, by reference thereto.

As used herein, the term "polyolefin" refers to any polymerized olefin, which can be linear, branched, cyclic, aliphatic, aromatic, substituted, or unsubstituted. More specifically, included in the term polyolefin are homopolymers of olefins, copolymers of olefins, copolymers of an olefin and an non-olefinic comonomer copolymerizable with the olefin, such as vinyl monomers, modified polymers thereof, and the like. Specific examples include polypropylene homopolymers, polyethylene homopolymers, polybutene, propylene/alpha-olefin copolymers, ethylene/alpha-olefin copolymers, butene/alpha-olefin copolymers, ethylene/vinyl acetate copolymers, ethylene/ethyl acrylate copolymers, ethylene/butyl acrylate copolymers, ethylene/methyl acrylate copolymers, ethylene/acrylic acid copolymers, ethylene/methacrylic acid copolymers, modified polyolefin resins, ionomer resins, polymethylpentene, etc. The modified polyolefin resins include modified polymers prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyamide", "polyester", "polyurethane", etc., are inclusive of not only polymers comprising repeating units derived from monomers known to polymerize to form a polymer of the named type, but are also inclusive of comonomers, derivatives, etc., which can copolymerize with monomers known to polymerize to produce the named polymer. Derivatives also include ionomers of the polymer(s). For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-modified polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the phrase "ethylene alpha-olefin copolymer", and "ethylene/alpha-olefin copolymer", refer to such heterogeneous materials as linear low density polyethylene (LLDPE), and very low and ultra low density polyethylene (VLDPE and ULDPE); and homogeneous polymers such as metallocene catalyzed polymers such as EXACT (TM) materials supplied by Exxon, and TAFMER (TM) materials supplied by Mitsui Petrochemical Corporation. These materials generally include copolymers of ethylene with one or more comonomers selected from $C_4$ to $C_{10}$ to alpha-olefins such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. LLDPE, as used herein, has a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY (TM) resins, are also included as another type of ethylene alpha-olefin copolymer useful in the present invention.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "outer layer" refers to any film layer of a multilayer film having only one of its principal surfaces directly adhered to another layer of the film.

As used herein, the phrase "inside layer" refers to the outer layer, of a multilayer film packaging a product, which is closest to the product, relative to the other layers of the multilayer film.

As used herein, the phrase "outside layer" refers to the outer layer, of a multilayer film packaging a product, which is furthest from the product relative to the other layers of the multilayer film.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any internal film layer which has a primary function other than serving as an adhesive or compatibilizer for adhering two layers to one another. Usually, the core layer or layers provide the multilayer film with a desired level of strength, e.g., modulus, and/or optics, and/or added abuse resistance, and/or specific impermeability.

As used herein, the phrase "sealant layer", with respect to multilayer films, refers to an outer film layer, or layers, involved in the sealing of the film to itself or another layer. It should also be recognized that in general, the outer 0.5 to 3 mils of a film can be involved in the sealing of the film to itself or another layer. With respect to packages having only fin-type seals, as opposed to lap seals, the phrase "sealant layer" generally refers to the inside film layer of a package, as well as supporting layers adjacent this sealant layer often being sealed to itself, and frequently serving as a food contact layer in the packaging of foods.

As used herein, the phrase "tie layer" refers to any internal layer having the primary purpose of adhering two layers to one another.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, which forces it through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion coating processes.

As used herein, the phrase "machine direction", herein abbreviated "MD", refers to a direction "along the length" of the film, i.e., in the direction of the film as the film is formed during extrusion and/or coating.

As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when subjected to selected heat, as measured by ASTM D 2732, as known to those of skill in the art.

If the heat-shrinkable film according to the invention is made by orienting a tape which is heated over a very short time period, such as a tape heated by infrared radiation, then the film may consist solely of polyamide layers. However, if the film is heated over a relatively long time period, such as being heated in hot water, the polyamide tends to crystallize to a relatively high level before the orientation step, which produces problems during the orientation step. In this latter situation, the film further requires the presence of a second inner layer which does not undergo substantial crystallization during the relatively long heating step immediately prior to orientation. Suitable polymers for use as the second inner layer include polyolefins, especially ethylene/alpha-olefin copolymer, ethylene/unsaturated ester copolymer, and ethylene/unsaturated acid copolymer. The second inner layer also enhances the optical characteristics of the film and provides the film with desired shrink characteristics in addition to reducing the cost of the multilayer film. Preferably, the polyamide layers are relatively thin layers separated by one or more polyolefin layers. Preferably, the sum of the thicknesses of the first outer layer, the second outer layer, and the first inner layer of the heat-shrinkable casing film is less than about 80 percent of the total thickness of the casing film; more preferably, less than about 70 percent; still more preferably, less than about 60 percent; yet still more preferably, less than about 50 percent. Preferably, the first inner layer comprises high modulus polyamide such as polyamide 6, polyamide 66, and polyamide 6/66. more preferably, polyamide 6. Preferably, the thickness of the first inner layer comprises from about 5 to 70 percent, based on the total thickness of the multilayer film; more preferably, from about 10 to 40 percent; still more preferably, from about 10 to 30 percent; and yet still more preferably, from about 10 to 20 percent.

In general, the film used in the present invention is a multilayer film having from 2 to 20 layers. Preferably, the film used in the present invention comprises from 4 to 12 layers; more preferably, from 6 to 10 layers.

Preferably, the multilayer film used in the present invention can have any total thickness desired, so long as the film provides the desired properties for the particular packaging operation in which the film is used. Preferably, the film used in the present invention has a total thickness (i.e., a combined thickness of all layers), of from about 0.5 to 10 mils (1 mil equals 0.001 inch); more preferably, from about 1 to 8 mils; and still more preferably, from 2 to 4 mils.

Preferably, the polyamide outer layers each have a thickness of from about 0.1 to 1 mil; more preferably, from about 0.2 to 0.6 mil; still more preferably, from about 0.3 to 0.5 mils.

Preferably, the polyamide core layer(s) each has a thickness of from about 0.1 to 1 mil; more preferably, from about 0.2 to 0.5 mils; and still more preferably, from about 0.3 to 0.4 mil.

If the multilayer film comprises an $O_2$-barrier layer, preferably the barrier layer has a thickness of from about 0.05 to 1 mil; more preferably, from about 0.1 to 0.5 mil.

If the multilayer film comprises one or more tie layers, preferably each of the tie layers has a thickness of from about 0.1 to 2 mils; more preferably, from about 0.2 to 1 mil; still more preferably, from about 0.3 to 0.5 mil.

It should be noted that the modulus of the film of the present invention should be high enough that so that the film does not stretch to an undesirable degree during the backseaming process. Thus, although the film of the present invention preferably has a modulus of at least 50,000 psi; more preferably, the film has a modulus of from about 50,000 to 250,000 psi; still more preferably, from about 70,000 to 150,000 psi.; and yet still more preferably, from about 80,000 to 120,000 psi. It should be kept in mind that if the modulus of the film is too high, problems could occur after backseaming, e.g., the film could crack when being wound up after backseaming. Furthermore, too high a modulus is especially undesirable if the film is to be used as a casing which is to undergo shirring, as films of too high a modulus may crack during shirring. On the other hand, if the modulus of the film is too low, the film tends to stretch too much during backseaming, as discussed above.

FIG. 1 is a cross-sectional view of six-layer film 20, comprising first outer layer 22, second outer layer 24, core polyamide layer 26, first core polyolefin layer 28, second core polyolefin layer 30, and O2-barrier layer 32. Both first outer layer 22 and second outer layer 24 comprise polyamide. Preferably, second outer layer 24 further comprises an antiwatermark agent,. e.g., silica, in an amount of about 1 weight percent. Second outer layer 24 is the outside layer of the film tube formed during the process of manufacturing the film. If the film tube is slit lengthwise, resulting in a flat film which is thereafter backseamed in order to form a backseamed casing, preferably the film is positioned so that the outer layer 22 forms the outside layer of the casing, with outer layer 24 forming the inside layer of the casing.

Outer layer 24 preferably serves as a product-contact layer, e.g., the meat-contact layer, as well as serving as a sealing layer in the event that, for example, the film is used in the preparation of a lap-sealed casing. Outer layer 24 comprises polyamide, and preferably the only polymer in outer layer 24 is polyamide. Of course, outer layer 24 can comprise a blend of two or more polyamides. The presence of the polyamide(s) in outer layer 24 provides outer layer 24 with good meat-adhesion characteristics for the packaging of relatively high-fat meat products, such as liver sausage, bologna, mortadella, etc. Furthermore, the polyamides provide outer layer 24 with sealing characteristics which are suitable for making cook-in casings, i.e., the seal can survive the relatively strenuous conditions imposed by the cook-in process.

Outer layer 22 preferably serves as an abuse layer, i.e., the outside layer of a package, as well as serving as a sealing layer in the event that, for example, the film is used in the preparation of a lap-sealed casing. Outer layer 22 comprises polyamide and/or polyester; and preferably the only polymer in outer layer 22 is polyamide. Of course, outer layer 22 can comprise a blend of two or more polyamides. The presence of the polyamide(s) in outer layer 22 provides this layer with sealing characteristics compatible with polyamide-containing outer layer 24, the resulting seal between outer layer 22 and outer layer 24 being capable of surviving the relatively strenuous conditions imposed by the cook-in process.

It has been discovered that core layer 26, which comprises polyamide, serves to prevent necking down on the forming shoe to the extent that the backseaming process is interrupted by film rupture, or by causing the film to draw so tightly around the forming shoe that the film cannot be forwarded. In this manner, during the backseaming operation the necking down of the film is reduced by reducing that region of the film which shrinks due to the propagation of heat outward from the heat seal bar.

It has been discovered that core polyolefin layers 28 and 30 serve to provide the film with layers which do not undergo substantial crystallization during a prolonged heating of a tape which is immediately thereafter blown into a bubble in order to result in a tube of oriented film. Prolonged heating is present, for example, if the tape is heated by being passed through hot water immediately prior to orientation. Prolonged heating is often desirable, in order to soften the tape to facilitate orientation (preferably, the polymers are above their respective glass transition temperature for ease of orientation). Prolonged heating causes the polyamide layers to crystallize to an extent that without further support, the orientation bubble will break to an undesirable or unacceptable degree. However, if the tape does not undergo prolonged heating, e.g., if the tape is heated by infrared radiation for a period of less than about 5 seconds immediately prior to orientation, one or more core polyolefin layers are not needed, as the polyamide layers can be oriented because they have not crystallized to an extent that unacceptable bubble breakage occurs.

$O_2$-barrier layer 32 serves to provide multilayer film 20 with a layer which is especially impervious to atmospheric oxygen. $O_2$-barrier layer 32 serves to increase the shelf life of a product packaged inside, for example, a casing formed from multilayer film 20. As known to those of skill in the art, polymers which serve as a barrier to $O_2$ include polyvinylidene chloride (PVDC), ethylene/vinyl alcohol copolymer (EVOH), polyamides, and polyalkylene carbonate. However, EVOH is the preferred polymer for use in $O_2$-barrier layer 32, as it does not degrade upon irradiation thereby facilitating the production of coextruded, totally irradiated films, which are preferred for cook-in conditions.

Figure 2:
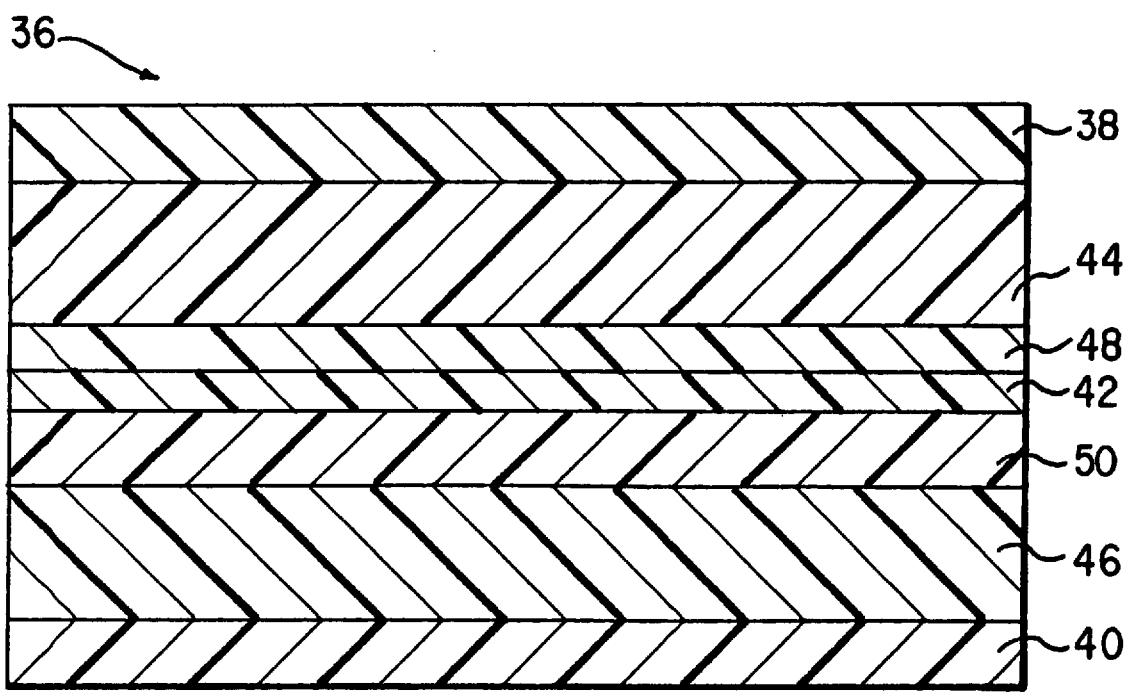
FIG. 2 illustrates an enlarged cross-sectional view of a seven-layer multilayer film in accord with the present invention.

FIG. 2 illustrates a cross-sectional view of seven-layer film 36. Film 36 is similar to film 20, illustrated in FIG. 1, in that film 36 comprises first outer layer 38, second outer layer 40, O2-barrier layer 42, first polyolefin core layer 44, and second polyolefin core layer 46. Furthermore, the preferred polymers for use in the various layers of film 36 correspond to the preferred polymers for use in the various layers of film 20.

However, unlike the film of FIG. 1, film 36 comprises two polyamide core layers, i.e., one on each side of the O2-barrier layer. First polyamide core layer 48 is between O2-barrier layer 42 and first polyolefin core layer 44. Second polyamide core layer 50 is between O2-barrier layer 42 and second polyolefin core layer 46. Preferably, as with the film of FIG. 1, second outer layer 40 comprises an antiwatermark agent, e.g., silica, in an amount of about 1 weight percent, with second outer layer 40 being the outside layer of the film tube formed during the process of manufacturing the film. If the film tube is slit lengthwise, resulting in a flat film which is thereafter backseamed in order to form a backseamed casing, preferably the film is positioned so that the outer layer 38 forms the outside layer of the casing, with outer layer 40 forming the inside layer of the casing.

Figure 3:
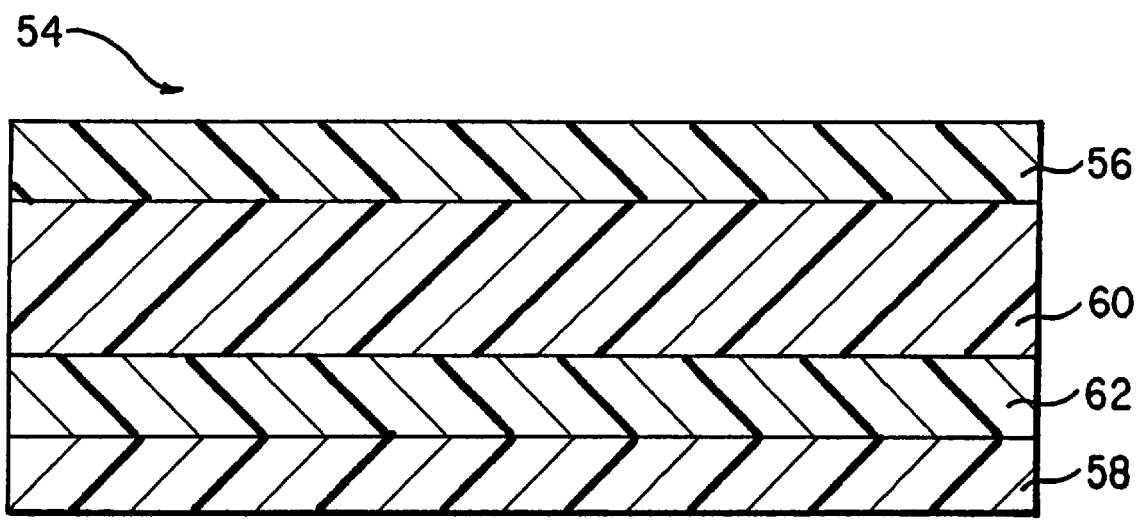
FIG. 3 illustrates an enlarged cross-sectional view of a four-layer multilayer film in accord with the present invention.

FIG. 3 illustrates a cross-sectional view of four-layer film 54. Film 54 is similar to the films of FIGS. 1 and 2. Furthermore, the preferred polymers for use in the various layers of film 54 correspond to the preferred polymers for use in the various layers of film 20. Four-layer film 54 comprises first outer layer 56, second outer layer 58, core polyolefin layer 60, and polyamide core layer 62. Preferably, as with the film of FIG. 1, second outer layer 58 comprises the antiwatermark agent in an amount of about 1 weight percent, with second outer layer 58 preferably being the outside layer of the film tube formed during the process of manufacturing the film.

The films of FIGS. 1, 2, and 3 are especially suited for conversion to heat-shrinkable backseamed casings for the packaging of meat products, in accordance with the present invention.

FIG. 4 illustrates a cross-sectional view of lap-sealed casing 66. Lap-sealed casing 66 has casing film 68 having inside surface 70 sealed to outside surface 72 at seal 74, the seal being located where a first film region overlaps a second film region. Although casing film 68 can be a monolayer film or a multilayer film, preferably casing film 68 is a multilayer film such as one of the multilayer films illustrated in FIGS. 1–3, described above.

FIG. 5 illustrates a cross-sectional view of butt-sealed casing 78. Butt-sealed casing 78 has casing film 80 sealed to butt-seal tape 82. Casing film 80 has inside surface 84 and outside surface 86. Outside surface 86 is sealed to butt-seal tape 82 where edges 88 and 90 of casing film 80 are abutted in close proximity to one another. In this manner, butt-seal tape 82 provides a longitudinal seal along the length of butt-sealed casing 78. Although butt-seal tape 82 can be a monolayer film or a multilayer film, preferably butt-seal tape 82 is a multilayer film. In the preparation of butt-sealed casing 78, edges 88 and 90 of casing film 80 are abutted against one another, and butt seal tape 86 is preferably heat sealed to outer surface 86, more particularly, to outer surface 86 in the region alongside edges 88 and 90, forming seals 92 and 94.

Figure 6:
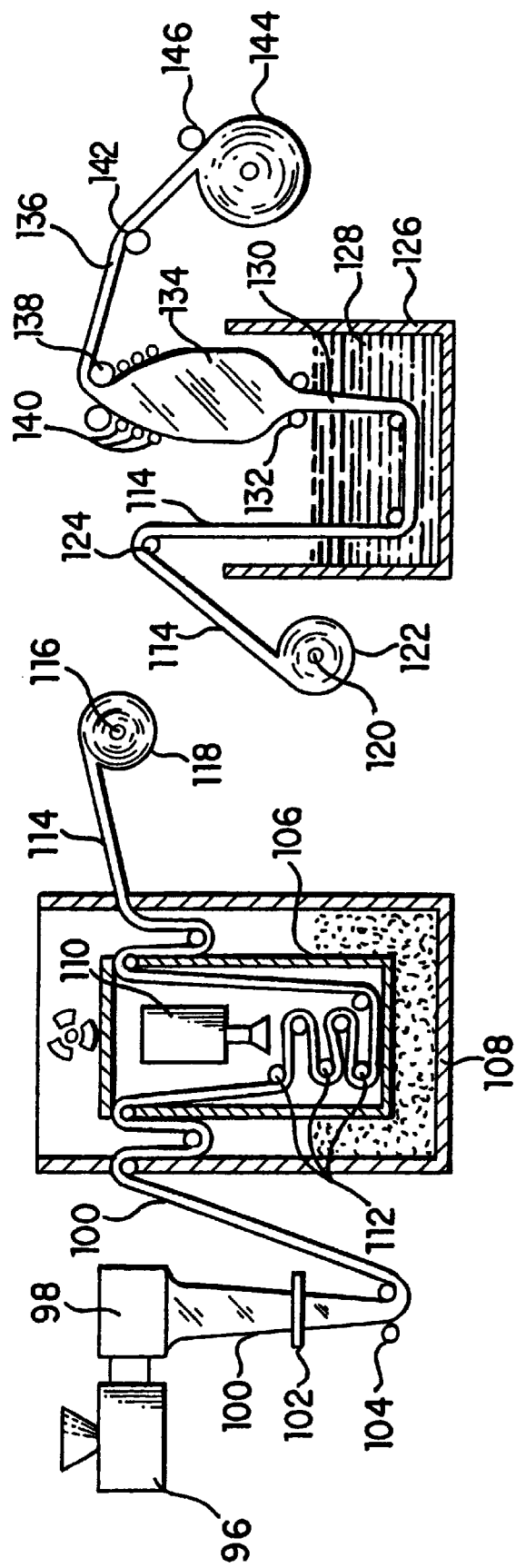
FIG. 6 illustrates a schematic view of a process for making preferred heat-shrinkable multilayer films according to the present invention.

The films of FIGS. 1–3 can be prepared in accordance with a process as schematically illustrated in FIG. 6. In the process illustrated in FIG. 6, solid polymer beads (not illustrated) are fed to a plurality of exturders (for simplicity, only one extruder is ilustrated). Inside extruders 96, the polymer beads are degassed, following which the resulting bubble-free melt is forwarded into die head 98, and extruded through an annular die, resulting in tubing tape 100 which is preferably from about 15 to 30 mils thick, and preferably has a lay-flat width of from about 2 to 10 inches.

After cooling or quenching by water spray from cooling ring 102, tubing tape 100 is collapsed by pinch rolls 104, and is thereafter fed through irradiation vault 106 surrounded by shielding 108, where tubing tubing 100 is irradiated with high energy electrons (i.e., ionizing radiation) from iron core transformer accelerator 110. Tubing tape 100 is guided through irradiation vault 106 on rolls 112. Preferably, tubing tape 100 is irradiated to a level of from about 40–100 kGy, resulting in irradiated tubing tape 114. Irradiated tubing tape 114 is wound upon windup roll 116 upon emergence from irradiation vault 106, forming irradiated tubing tape coil 118.

After irradiation and windup, windup roll 116 and irradiated tubing tape coil 118 are removed and installed as unwind roll 120 and unwind tubing tape coil 122, on a second stage in the process of making the tubing film as ultimately desired. Irradiated tubing 114, being unwound from unwind tubing tape coil 122, is then passed over guide roll 124, after which irradiated tubing 114 is passed through hot water bath tank 126 containing hot water 128. Irradiated tubing 114 is then immersed in hot water 128 (preferably having a temperature of about 185–210° F.) for a period of about 20–60, i.e., for a time period long enough to bring the film up to the desired temperature for biaxial orientation. Thereafter, hot, irradiated tubular tape 130 [90] is directed through nip rolls 132, and bubble 134 is blown, thereby transversely stretching hot, irradiated tubular tape 130 so that an oriented film tube 136 is formed. Furthermore, while being blown, i.e., transversely stretched, nip rolls 138 have a surface speed higher than the surface speed of nip rolls 132, thereby resulting in longitudinal orientation. As a result of the transverse stretching and longitudinal drawing, oriented film tube 136 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 134 is maintained between pinch rolls 132 and 138, blown tubing 136 is collapsed by rolls 140, and thereafter conveyed through pinch rolls 138 and across guide roll 142, and then rolled onto wind-up roll 144. Idler roll 146 assures a good wind-up. The resulting multilayer film can be used to form backseamed casings, etc., which, in turn, can be used for the packaging of meat products, in accordance with the present invention.

The films of Examples 1–2, set forth below, were prepared according to the process described immediately above. These examples, together with data provided in Table 1, below, provide additional details on the films, its use in the packaging of a meat product, and the unexpected results obtained from the use of the film during the sealing process, and subsequent packaging and cook-in of the meat product.

Figure 7:
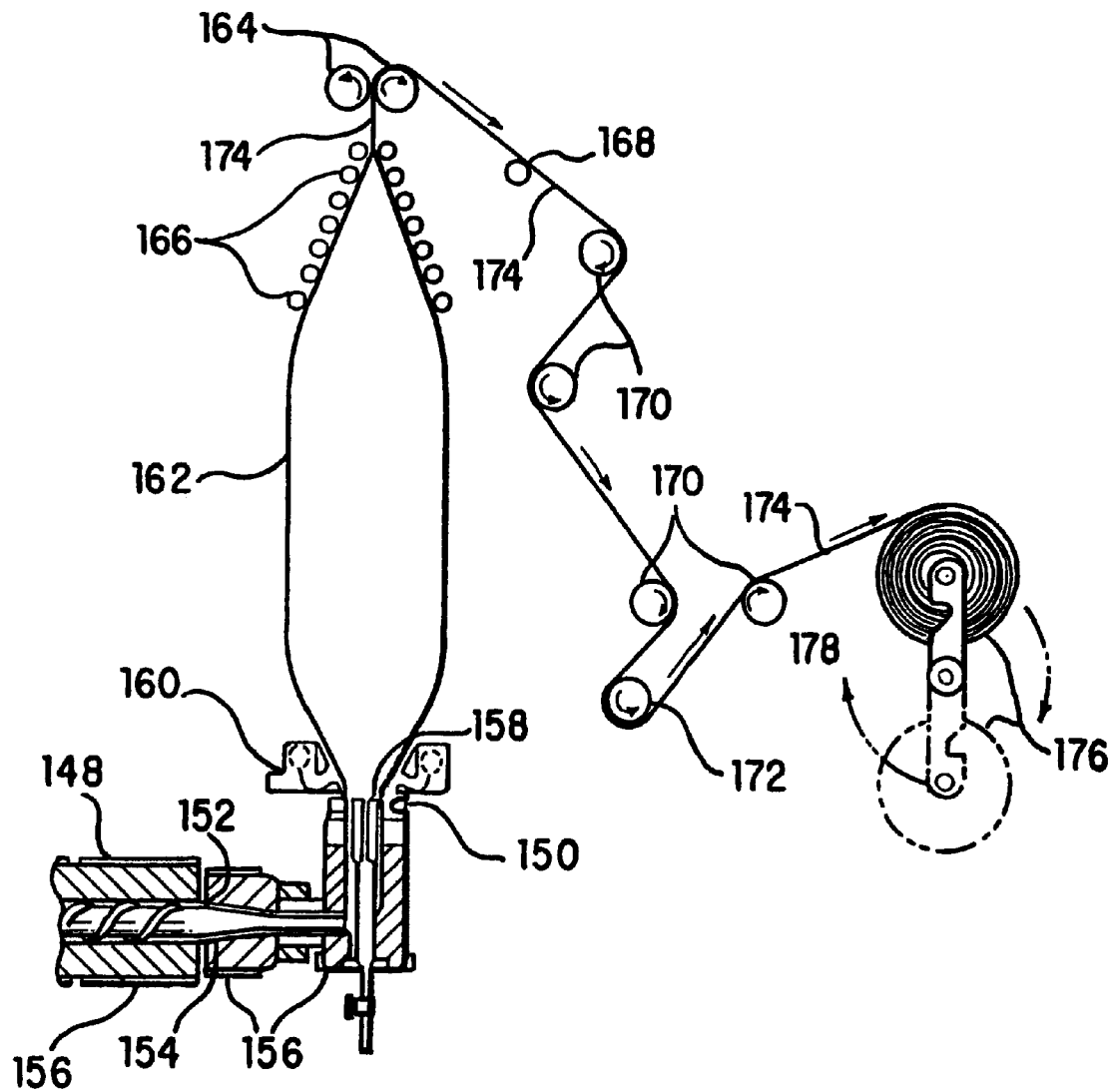
FIG. 7 illustrates a schematic view of an alternative process for making preferred non-heat-shrinkable multilayer films according to the present invention.

FIG. 7 illustrates a schematic view of an alternative process useful in making films according to the present invention. Although for the sake of simplicity only one extruder 148 is illustrated in FIG. 7, there are preferably at least two extruders, and more preferably, at least three extruders. That is, preferably at least two extruders, and more preferably at least three extruders, supply molten polymer to coextrusion die 150 for the formation of, for example, outer layers 22 and 24 of the six-layer film illustrated in FIG. 1; and a plurality of additional extruder supply molten polymer to coextrusion die 150 for the formation of, for example, a plurality of core layers 26, 28, 30, and 32 in the six-layer film illustrated in FIG. 1. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 148 as an example, each of the extruders is preferably equipped with a screen pack 152, a breaker plate 154, and a plurality of heaters 156. Each of the coextruded film layers is extruded between mandrel 158 and die 150, and the extrudate is cooled by cool air flowing from air ring 160. The resulting blown bubble 162 is thereafter guided into a collapsed configuration by nip rolls 164, via guide rolls 166. The collapsed tube is optionally passed over treated bar 168, and is thereafter passed over idler rolls 170, and around dancer roll 172 which imparts tension control to collapsed tube 174, after which the collapsed tube is wound into roll 176 via winding mechanism 178.

The polymer components used to fabricate multilayer films according to the present invention may also contain appropriate amounts of other additives normally included in such compositions. These include slip agents such as talc, antioxidants, fillers, dyes, pigments and dyes, radiation stabilizers, antistatic agents, elastomers, and the like additives known to those of skill in the art of packaging films.

Multilayer films according to the present invention can be prepared by any means known to those of skill in the art, e.g., via coextrusion and/or extrusion coating, and/or lamination. One advantage of extrusion coating and lamination over full coextrusion, is that a substrate tape can be irradiated before coating or lamination, so that in the resulting multilayer film less than all layers comprise a crosslinked polymer network.

The multilayer film of the present invention preferably comprises a crosslinked polymer network. Preferably, the crosslinked polymer network is achieved by irradiating the tape or film. As stated above, some or all of the layers of the multilayer film can comprise crosslinked polymer networks.

In the irradiation process, the film is subjected to an energetic radiation treatment, such as high energy electron treatment, which induces cross-linking between molecules of the irradiated material. The irradiation of polymeric films is disclosed in U.S. Pat. No. 4,064,296, to BORNSTEIN, et al., which is hereby incorporated in its entirety, by reference thereto. BORNSTEIN, et al. discloses the use of ionizing radiation for crossing the polymer present in the film.

Radiation dosages are referred to herein in terms of the radiation unit "RAD", with one million RADS, also known as a megarad, being designated as "MR", or, in terms of the radiation unit kiloGray (kGy), with one kiloGray representing 10 MR. A suitable radiation dosage of high energy electrons is in the range of up to about 16–166 kGy, more preferably about 44–139 kGy, and still more preferably, 71–111 kGy. Preferably, irradiation is carried out by an electron accelerator and the dosage level is determined by standard dosimetry methods.

As used herein, the phrases "corona treatment" and "corona discharge treatment" refer to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface.

Corona treatment of polymeric materials is disclosed in U.S. Pat. No. 4,120,716, to Bonet, issued Oct. 17, 1978, herein incorporated in its entirety by reference thereto, discloses improved adherence characteristics of the surface of polyethylene by corona treatment, to oxidize the polyethylene surface. U.S. Pat. No. 4,879,430, to Hoffman, also hereby incorporated in its entirety by reference thereto, discloses the use of corona discharge for the treatment of plastic webs for use in meat cook-in packaging, with the corona treatment of the inside surface of the web to increase the adhesion of the film to the proteinaceous material.

Although corona treatment is a method of treatment of the multilayer film of the present invention, plasma treatment of the film may also be used.

Although in general the product in the package can be any cooked meat product, preferably the cooked meat product comprises at least one member selected from the group consisting of liver sausage, mortadella, bologna, poultry, pork, beef, lamb, goat, horse, and fish; more preferably, liver sausage, mortadella, and bologna.

Figure 8:
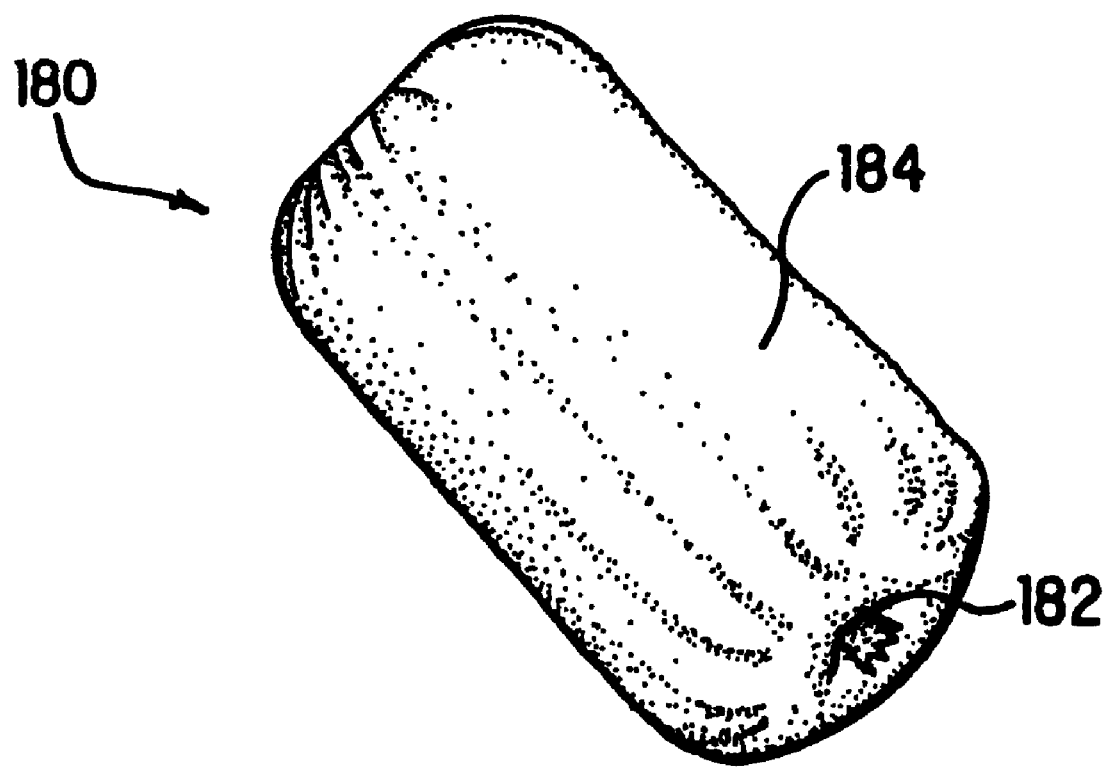
FIG. 8 illustrates a perspective view of a package according to the present invention.

FIG. 8 illustrates one embodiment of a packaged product 180 of the present invention, the product being packaged in a casing closed by a pair of clips 182 at each end thereof, with only one being illustrated in FIG. 8. Film 184, used to package the meat product therewithin, can be, for example, multilayer film 20 illustrated in FIG. 1, multilayer film 36 illustrated in FIG. 2, or multilayer film 54, illustrated in FIG. 3, all of which are discussed in detail above, and examples of which are provided in Examples 1–3 below. In FIG. 8, the cooked meat product preferably comprises liver sausage.

The invention is illustrated by the following examples, which are provided for the purpose of representation, and are not to be construed as limiting the scope of the invention. Unless stated otherwise, all percentages, parts, etc. are by weight.

EXAMPLE 1

A 6-Layer Preferred Film According to the Invention

A 4-inch tape was produced by the coextrusion process described above wherein the tape cross-section was as follows:

2.1 mils of a blend of Nylon#3 (50%) and Nylon#2 (50%)/4.1 mils of LLDPE#1/1.3 mils of a blend of Nylon#1 (50%) and Nylon# 2 (50%)/1.3 mils of EVOH/3.8 mils of LLDPE#1/1.9 mils of a blend of Nylon#3 (49%), Nylon#2 (49%), and Silica (1%).

The resins used in the various film layers were as follows:

Nylon#1 was ULTRAMID® B4 polyamide 6, obtained from BASF Corporation, of Parsippany, N.J.;

Nylon#2 was GRILON® CF6S polyamide 6/12 copolymer, obtained from EMS American Grilon, Inc., of Sumter, S.C.;

Nylon#3 was VESTAMID (TM) Z7319 polyamide 12, obtained from Huls America, Inc., of Piscataway, N.J.;

LLDPE#1 was TYMOR® 1203 anhydride grafted linear low density polyethylene, obtained from Morton International, of Chicago, Ill.;

EVOH was EVAL® LC-E105A ethylene/vinyl alcohol copolymer, obtained from Eval Company of America, of Lisle, Ill.; and Silica was SUPERFINE SUPER FLOSS (TM) silica antiblock, obtained from Celite® Division, Johns-Manville Products Corporation, of N.Y., N.Y.

The 6-layer film was prepared by extruding all the above-identified resins at between 380° F. and 530° F., with the die being held at a temperature of approximately 420° F. The extruded tape was cooled with water and flattened, the flattened width being 4 inches. This tape was then passed through the scanned beam of an electronic crosslinking unit where it received a total dosage of 105 kGy. After irradiation, the flattened tape was passed through hot water having a temperature of from about 206° F.–210° F., inflated into a bubble, and oriented to result in a tube of oriented film, the tube having a lay flat width of 11 inches, with the multilayer film having a total thickness of 2.2 mils. The resulting film had about 20% free shrinkage in the longitudinal direction and about 30% free shrink in the transverse direction, when immersed in hot water at 185° F. (using ASTM method D 2732-83).

The resulting tubing was slit into film. The film was folded longitudinally, i.e., along its length, about a forming shoe with opposed edges being joined by applying a heat seal longitudinally over the overlap to form a lap seal.

This tubing was then clipped at one end, filled with uncooked bologna from the open end, and clipped again to result in chubs weighing approximately 8 pounds. The chubs were then cooked in a high humidity environment from 145° F.–170° F. for a total of 4 hours. The cooked chubs were then showered with water for 10 minutes, and cooled in an ice-bath for 12 hours. The chilled chubs were found to have good protein-adhesion (i.e., no purge) with the seals surviving the cook test. The protein adhesion level was good and very consistent.

EXAMPLE 2

A 7-Layer Preferred Film According to the Invention

A 5-inch tape was produced by the coextrusion process described above wherein the tape cross-section was as follows:

2.2 mils of a blend of Nylon#3 (50%) and Nylon#2 (50%)/4.1 mils of a blend of LLDPE#1 (80%) and pigment (20%)/0.9 mil of a blend of Nylon#1 (50%) and Nylon# 2 (50%)/0.8 mil of EVOH/2.1 mils of a blend of Nylon# 1 (50%) and Nylon# 2 (50%)/3.6 mils of a blend of LLDPE# 1 (80%) and pigment (20%)/2.6 mils of a blend of Nylon#3 (50%) and Nylon#2 (50%).

The resins used in the various film layers were as set forth above in Example 1. The pigment is EPE 10214-C opaque white color concentrate from Teknor Apex Corporation. The 7-layer film was prepared by extruding all the above-identified resins at between 380° F. and 530° F., the die being held at a temperature of approximately 420° F. The extruded tape was cooled with water and flattened, the flattened width being 4 inches. This tape was then passed through the scanned beam of an electronic crosslinking unit where it received a total dosage of 105 kGy. After irradiation, the flattened tape was passed through hot water having a temperature of from about 190° F.–200° F., inflated into a bubble, and oriented to result in a tube of oriented film, the tube having a lay flat width of 15 inches, with the multilayer film having a total thickness of 2.3 mils. The resulting film had about 20% free shrinkage in the longitudinal direction and about 30% free shrink in the transverse direction, when immersed in hot water at 185° F. (using ASTM method D 2732-83).

The resulting tubing was slit into film. The film was folded longitudinally, i.e., along its length, about a forming shoe with opposed edges being joined by applying a heat seal longitudinally over the overlap to form a lap seal. The film backseamed well.

This tubing was then clipped at one end, filled with uncooked bologna from the open end, and clipped again to result in chubs weighing approximately 8 pounds. The chubs were then cooked in a high humidity environment from 145° F.–170° F. for a total of 4 hours. The cooked chubs were then showered with water for 10 minutes, and cooled in an ice-bath for 12 hours. The chilled chubs were found to have good protein-adhesion (i.e., no purge) with the seals surviving the cook test. The protein adhesion level was good and very consistent.

EXAMPLE 3

4-Layer Film and Casing Therefrom, According to the Invention

A 5-inch tape is made by the coextrusion process described above wherein the tape cross-section is as follows:

2.5 mils of a blend of Nylon#3 (50%) and Nylon#2 (50%)/6 mils of a blend of EVA#1 (80%) and LLDPE#1 (20%)/2.5 mils of a blend of Nylon#1 (50%) and Nylon#2 (50%)/2.5 mils of a blend of Nylon#3 (50%) and Nylon#2 (50%);

wherein EVA#1 is BYNEL® 3036 anhydride-modified ethylene/vinyl acetate copolymer, and all other resins are as identified in Examples 1–2, above.

The extruded tape is cooled with water and flattened and then passed through the scanned beam of an electronic crosslinking unit where it receives a total dosage of 105 kGy. After irradiation, the flattened tape is passed through hot water having a temperature of from about 204° F.–210° F., inflated into a bubble, to result in a tube of oriented film, the tube having a lay flat width of 15 inches, with the multilayer film having a total thickness of 2.2 mils. The resulting film tube is slit, with the resulting casing film being folded (and overlapped) longitudinally about a forming shoe, with overlapping regions being joined by applying a heat seal longitudinally over the overlaps, to form a lap seal. The resulting casing has adequate seal strength and protein adhesion.

EXAMPLE 4

6-Layer Film and Butt-Sealed Casing Therefrom, According to the Invention

A blown film is made wherein the film cross-section is as follows:

0.2 mil of Nylon#1/0.1 mil of LLDPE#1/0.2 mil of EVOH/0.4 mils of Nylon#1/0.1 mil of LLDPE#1/1.0 mil of LLDPE#2;

wherein LLDPE #2 is DOWLEX 2045.03 (TM) linear low density polyethylene, obtained from The Dow Chemical Company, of Midland, Mich., and all other resins are as identified in Examples 1–3, above.

The film is then slit lengthwise, with the resulting casing film being folded longitudinally about a forming shoe with opposing edges being brought together such that the polyamide outer layer is the inside layer of a casing to be formed. A butt-sealed casing is then made by laying a tape film on top of the opposing edges of the folded casing film. Preferably, the tape film is a non-heat-shrinkable 5-layer film having the following composition: 0.3 mils LLDPE#2/0.1 mil LLDPE#1/0.2 mil EVOH/0.1 mil LLDPE#1/0.3 mils LLDPE#2. The tape film is sealed to the casing film by applying a heat seal longitudinally over the overlap to seal the tape film to the outside of the casing film, i.e., sealing the tape film to the outside LLDPE#2 layer of the casing film. The resulting butt-sealed backseamed casing has adequate seal strength and protein adhesion.

EXAMPLE 5

Comparative Film Without a Polyamide Core Layer, Which Does Not Backseam

A 5-inch tape was made by the coextrusion process described above wherein the tape cross-section is as follows:

2.0 mils of a blend of Nylon#3 (50%) and Nylon#2 (50%)/6 mils of a blend of LLDPE #1 (80%) and EAO (20%)/2.5 mils of anhydride grafted LLDPE#1/1.3 mil of EVOH/1.3 mils of anhydride grafted LLDPE#1/3.0 mils of a blend of LLDPE#1 (80%) and EAO (20%)/1.9 mils of a blend of Nylon#3 (50%) and Nylon 2 (50%), wherein EAO was EXACT 4011 (TM) homogeneous ethylene/alpha-olefin copolymer, obtained from the Exxon Chemical Company, of Baytown, Tex. All other resins were as identified in Examples 1–4, above. Thus, the film of this example differs from the films of Examples 1–4 in that it does not contain a polyamide core layer.

All the resins were extruded between 380° F. and 530° F., and the die was at approximately 420° F. The extruded tape was cooled with water and flattened, the flattened width being 5 inches. This tape was then passed through the scanned beam of an electronic crosslinking unit where it received a total dosage of 105 kGy. After irradiation, the flattened tape was passed through hot water having a temperature of from about 210° F.–212° F., inflated into a bubble, and oriented to result in a tube of oriented film, the tube having a lay flat width of 14 inches, with the multilayer film having a total thickness of 2.5 mils. The resulting film had a free shrink, in the longitudinal direction, of about 20 percent, and, in the transverse direction, about 30 percent, when immersed in hot water at 185° F., using ASTM method D2732-83.

The tubing was slit into film. An attempt was made to backseam the film by longitudinally folding it (and overlapping it) around a forming shoe with overlapping regions being joined by applying a heat seal longitudinally over the overlaps to form a lap seal. However, during this backseaming step, the film necked down severely on the forming shoe, thereby rupturing itself and disrupting the process. Thus, the film did not appear to be a viable backseamable film.

EXAMPLE 6

Comparative Film Without a Polyamide Core Layer, Which Would Not Backseam

A 5-inch tape was produced by the coextrusion process described above wherein the tape cross-section is as follows:

3.4 mils of a blend of Nylon#3 (50%) and Nylon#2 (50%)/6 mils of a blend of LLDPE #1 (80%) and EAO (20%)/2.5 mils of anhydride grafted LLDPE#1/1.3 mil of EVOH/1.3 mils of anhydride grafted LLDPE#1/3.0 mils of a blend of LLDPE#1 (80%) and EAO (20%)/3.1 mils of a blend of Nylon#3 (50%) and Nylon 2 (50%);

wherein all resins are as identified in Examples 1–5, above. Thus, the film of this example also differs from the films of Examples 1–4 in that it does not contain a polyamide core layer, and differs from the film of Example 5 in that in the instant example, the outer layers are thicker than the Example 5 film outer layers, thereby making the film of the instant example stiffer than the film of Example 5, i.e., a higher modulus than the film of Example 5.

All the resins were extruded between 380° F. and 530° F., and the die was at approximately 420° F. The extruded tape was cooled with water and flattened, the flattened width being 5 inches. This tape was then passed through the scanned beam of an electronic crosslinking unit where it received a total dosage of 105 kGy. After irradiation, the flattened tape was passed through hot water having a temperature of from about 210° F.–212° F., inflated into a bubble, and oriented to result in a tube of oriented film, the tube having a layflat width of 14 inches, with the multilayer film having a total thickness of 2.3 mils. The resulting film had a free shrink in the longitudinal direction of about 20 percent, and in the transverse direction had a free shrink of about 30 percent. Free shrink was determined by immersing the film in hot water at 185° F., using ASTM method D2732-83.

As in Example 5, the tubing was slit into film. An attempt was made to backseam the film by longitudinally folding it (and overlapping it) around a forming shoe with overlapping regions being joined by applying a heat seal longitudinally over the overlaps to form a lap seal. However, during this backseaming step, the film necked down severely on the forming shoe, thereby rupturing itself and disrupting the process. Thus, the film did not appear to be a viable backseamable film.

EXAMPLE 7

Comparative Film Having Corona-Treated Inside Surface with Inside Layer with Anhydride Functionality, Film Having Poor Purge Resistance A 5-inch tape was produced by the coextrusion process described above wherein the tape cross-section is as follows:

3.2 mils of LLDPE #3/2.3 mils of a blend of EVA#2 (80%) and LLDPE #2 (20%)/1.0 mil of anhydride grafted LLDPE#1/1.9 mils of a blend of Nylon# 1 (50%) and Nylon#2 (50%)/1.1 mil of EVOH/1.9 mils of anhydride grafted LLDPE#1/5.8 mils of a blend of EVA#2 (80%) and LLDPE#2 (20%)/3.2 mils of LLDPE #4, wherein:

LLDPE#3 was PLEXAR® PX 360 anhydride grafted linear low density polyethylene, obtained from Quantum Chemical Company, of Cincinnati, Ohio;

LLDPE#4 was DOWLEX® 2244A linear low density polyethylene, obtained from The Dow Chemical Company, of Midland, Mich.; and EVA#2 was ELVAX® 3128 ethylene/vinyl acetete copolymer, obtained from E.I. DuPont de Nemours & Co., of Wilmington, Del.; and wherein all other resins were as identified in Examples 1–6, above.

All the resins were extruded between 380° F. and 530° F., and the die was at approximately 420° F. The extruded tape was cooled with water and flattened, the flattened width being 5 inches. This tape was then passed through the scanned beam of an electronic crosslinking unit where it received a total dosage of 63.8 kGy. After irradiation, the flattened tape was passed through hot water having a temperature of from about 204° F.–210° F., inflated into a bubble, and oriented to result in a tube of oriented film, the tube having a layflat width of 15 inches, with the multilayer film having a total thickness of 2.3 mils. The resulting multilayer film had a free shrink in the longitudinal direction of about 20 percent, and in the transverse direction had a free shrink of about 30 percent. Free shrink was determined by immersing the film in hot water at 185° F., using ASTM method D2732-83. The film tubing was slit into flat film, and thereafter corona-treated to a surface energy level of 62 dynes/cm, and then immediately folded (and overlapped) longitudinally about a forming shoe, with the overlapping regions being joined by applying a heat seal longitudinally over the overlaps, to form a lap seal. The film backseamed well, i.e., without necking down around the forming shoe to the extent that the process was interrupted.

This backseamed tubing was clipped at one end, filled with uncooked bologna (a relatively high fat product) from its open end, and clipped again to result in chubs weighing approximately 8 pounds. The chubs were then step cooked in a high humidity environment from 145° F.–170° F. for a total of 4 hours. The cooked casings were then showered with water and cooled in an ice bath for 12 hours. The chilled casings were then examined for purge and found to have purge (fluid between the cooked meat product and the plastic material) at the casing layflat edges, where the edges had rubbed against the forming shoe. This rubbing of the edges on the forming shoe presumably "buffed" the corona treated surface at that location. The casings were also characterized by spotty, inconsistent protein adhesion.

A comparison of the operability of the films of Examples 1 and 2 with the inoperability of Comparative Examples 5 and 6 reveals that the core polyamide layer solves the problem of the necking down of the film on the forming shoe. Furthermore, although Comparative Example 7 (which has a core polyamide layer) does not neck down on the forming shoe, it does not adhere to the high fat bologna in the area where the corona treatment is buffed off.

Table 1, immediately below, reveals that the modulus of the film is not always determinative of operability of the film with respect to backseamability.

TABLE 1

| Film of Example No. | Modulus in Longitudinal Direction (psi) | Modulus in Transverse Direction (psi) |
|---|---|---|
| 1 (Working) | 95,200 | 85,300 |
| 2 (Working) | — | — |
| 5 (Comparative) | 64,400 | 61,100 |
| 6 (Comparative) | 87,500 | 87,200 |
| 7 (Comparative) | 61,700 | 63,100 |

More particularly, it should be noted that although, for example, the film of Comparative Example 5 has a modulus similar to the modulus of the film of Example 1, the film of Comparative Example 5 necked down on the forming shoe to the extent that it ruptured. This shows that providing a film of relatively high modulus, but without a polyamide core layer, does not provide the film with the characteristics needed to prevent necking down on the forming shoe during the backseaming operation. Furthermore, a comparison of the film of Comparative Example 4 with Comparative Example 6 reveals similar results, with respect to backseamability. This proves that it is the polymeric composition of the multilayer film, and the location of the layers relative to one another, rather than the overall modulus of the film, which is determinative of backseamability.

Although the present invention has been described with reference to the preferred embodiments, it is to be understood that modifications and variations of the invention exist without departing from the principles and scope of the invention, as those skilled in the art will readily understand. Accordingly, such modifications are in accordance with the claims set forth below.

What is claimed is:

1. A heat-shrinkable film comprising:
   (A) a first outer layer comprising a first polyamide having a melting point of from about 250° F.–400° F.;
   (B) a second outer layer comprising a second polyamide having a melting point of from about 250° F.–480° F.; and
   (C) an inner layer comprising at least one member selected from the group consisting of polyester and a third polyamide, wherein the first inner layer has a thickness of at least about 5% of a total thickness of the heat-shrinkable film.

2. The heat-shrinkable film according to claim 1, further comprising a second inner layer comprising polyolefin, wherein a total thickness of the first outer layer, the second outer layer, and the inner layer is less than about 80 percent, based on a total thickness of the multilayer film.

3. The heat-shrinkable film according to claim 2, wherein the polyolefin has both a crystallinity less than the crystallinity of the first inner layer, and a modulus less than the modulus of the first inner layer.

4. The heat-shrinkable film according to claim 2, wherein the polyolefin in the second inner layer is a first polyolefin, the film further comprising a third inner layer comprising a second polyolefin.

5. The heat-shrinkable film according to claim 4, wherein the first polyamide has a melting point of from about 260° F.–360° F., and the second polyamide has a melting point of from about 260° F. –360° F.

6. The heat-shrinkable film according to claim 5, wherein the first polyamide has a melting point of from about 275° F.–350° F., and the second polyamide has a melting point of from about 275° F.–350° F.

7. The heat-shrinkable film according to claim 4, wherein:
   the first polyolefin comprises at least one member selected from the group consisting of polypropylene, polyethylene, and polybutene; and
   the second polyolefin comprises at least one member selected from the group consisting of polypropylene, polyethylene, and polybutene.

8. The heat-shrinkable film according to claim 7, wherein:
   the first polyolefin comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer; and
   the second polyolefin comprises at least one member selected from the group consisting of ethylene/alpha-olefin copolymer, propylene/alpha-olefin copolymer, butene/alpha-olefin copolymer, ethylene/unsaturated ester copolymer, and ethylene/unsaturated acid copolymer.

9. The heat-shrinkable film according to claim 4, wherein:
   the first polyamide comprises at least one member selected from the group consisting of copolyamide 6/12, polyamide 12, copolyamide 66/69/6I, copolyamide 66/610, copolyamide 6/66, and copolyamide 6/69; and the second polyamide comprises at least one member selected from the group consisting of copolyamide 6/12, polyamide 12, copolyamide 66/69/6I, copolyamide 66/610, copolyamide 6/66, and copolyamide 6/69.

10. The heat-shrinkable film according to claim 9, wherein the first polyamide and the second polyamide are chemically substantially identical.

11. The heat-shrinkable film according to claim 9, wherein:

the first polyamide comprises at least one member selected from the group consisting of:
(a) copolyamide 6/12 comprising (i) caprolactam mer in an amount of from about 20 to 80 weight percent, and (ii) laurolactam mer in an amount of from about 80 to 20 weight percent;
(b) polyamide 12;
(c) copolyamide 66/69/6I comprising 10 to 50 weight percent hexamethylene adipamide mer; 10 to 50 weight percent polyamide 69 mer, and 10 to 60 weight percent hexamethylene isophthalamide mer; and wherein the second polyamide comprises at least one member selected from the group consisting of:
(a) copolyamide 6/12 comprising (i) caprolactam mer in an amount of from about 20 to 80 weight percent, and (ii) laurolactam mer in an amount of from about 80 to 20 weight percent;
(b) polyamide 12; and
(c) copolyamide 66/69/6I comprising 10 to 50 weight percent hexamethylene adipamide mer, 10 to 50 weight percent polyamide 69 mer, and 10 to 60 weight percent hexamethylene isophthalamide mer.

12. The heat-shrinkable film according to claim 1, wherein:

the inner layer is a first inner layer and comprises the third polyamide;

the film further comprises a second inner layer comprising a first polyolefin;

the film further comprises a third inner layer comprising a second polyolefin.

13. The heat-shrinkable film according to claim 12, wherein the third polyamide comprises at least one member selected from the group consisting of polyamide 6, polyamide 11, polyamide 12, polyamide 610, polyamide 66, polyamide 69, polyamide 612, copolyamide 6/66, copolyamide 66/610.

14. The heat-shrinkable film according to claim 12, further comprising a fourth inner layer which is an $O_2$-barrier layer.

15. The heat-shrinkable film according to claim 14, wherein the $O_2$-barrier layer comprises at least one member selected from the group consisting of ethylene/vinyl alcohol copolymer, polyvinylidene chloride, polyamide, and polyalkylene carbonate.

16. The heat-shrinkable film according to claim 12, wherein the third polyamide has a melting point of at least 350° F.

17. The heat-shrinkable film according to claim 16, wherein the second inner layer comprises a first anhydride-modified polyolefin, and the third inner layer comprises a second anhydride-modified polyolefin.

18. The heat-shrinkable film according to claim 16, wherein the film further comprises a first tie layer between the $O_2$-barrier layer and the first outer layer, and a second tie layer between the $O_2$-barrier layer and the second outer layer.

19. The heat-shrinkable film according to claim 16, wherein the first inner layer further comprises a fourth polyamide having a melting point of less than about 350° F.

20. The heat-shrinkable film according to claim 16, wherein the third polyamide has a melting point of at least 390° F.

21. The heat-shrinkable film according to claim 16, wherein the first inner layer comprises:

polyamide 6 in an amount of from about 40 to 90 weight percent, based on the weight of the first layer; and copolyamide 6/12 in an amount of from about 10 to 60 weight percent, based on the weight of the first layer, wherein the copolyamide 6/12 comprises caprolactam mer in an amount of from about 30 to 70 weight percent.

22. A package comprising a cooked meat product packaged in a heat-shrinkable film comprising:

(A) a first outer layer comprising a first polyamide having a melting point of from about 250° F.–400° F.;

(B) a second outer layer comprising a second polyamide having a melting point of from about 250° F.–480° F.; and (C) an inner layer comprising at least one member selected from the group consisting of polyester and a third polyamide, wherein the inner layer has a thickness of at least about 5% of a total thickness of the heat-shrinkable film;

wherein the cooked meat adheres to the film.

23. The packaged product according to claim 22, wherein the cooked meat product comprises at least one member selected from the group consisting of liver sausage, mortadella, bologna, braunschweiger, poultry, ham, beef, and fish.

24. The packaged product according to claim 22, wherein the meat comprises at least 5% fat.

25. A package comprising a cooked meat product packaged in a backseamed casing comprising a casing film comprising:

a first outer layer comprising polyamide having a melting point of from about 250° F.–400° F.; and a second outer layer comprising polyamide having a melting point of from about 250° F.–400° F.;

wherein the cooked meat adheres to the film.

* * * * *